United States Patent

[11] 3,573,583

| [72] | Inventors | William M. McCampbell<br>Huntsville;<br>Hershel M. Nance, Harvest, Ala. |
|---|---|---|
| [21] | Appl. No. | 885,571 |
| [22] | Filed | Dec. 16, 1969 |
| [45] | Patented | Apr. 6, 1971 |
| [73] | Assignee | The United States of America as represented by the administrator of the National Aeronautics and Space Administration |

[54] DC MOTOR SPEED CONTROL SYSTEM
6 Claims, 1 Drawing Fig.

[52] U.S. Cl. .................................................. 318/317
                        318/331, 318/345, 318/504
[51] Int. Cl. ....................................................... H02p 5/16
[50] Field of Search............................................ 318/317,
                        331, 342, 343, 345, 349, 504, 507

[56]           References Cited
           UNITED STATES PATENTS
| 3,171,074 | 2/1965 | Momberg et al.............. | 318/345X |
| 3,309,596 | 3/1967 | Limley.......................... | 318/345X |
| 3,475,672 | 10/1969 | Oltendorf..................... | 318/317X |

*Primary Examiner*—Oris L. Rader
*Assistant Examiner*—H. Huberfeld
*Attorneys*—L. D. Wofford, Jr., Arthur H. Tischer and G. T. McCoy ABSTRACT: A motor speed control circuit wherein a signal proportional to the IR drop of the armature is utilized to drive a self-excited inverter to obtain a feedback voltage equal to the IR drop of the armature. The feedback voltage is added as a positive feedback to a constant DC voltage to form the input to a unity gain amplifier. The last stage of the amplifier is in series with the armature of the motor. The speed at which the motor operates is controllable by means of varying the value of the constant DC voltage.

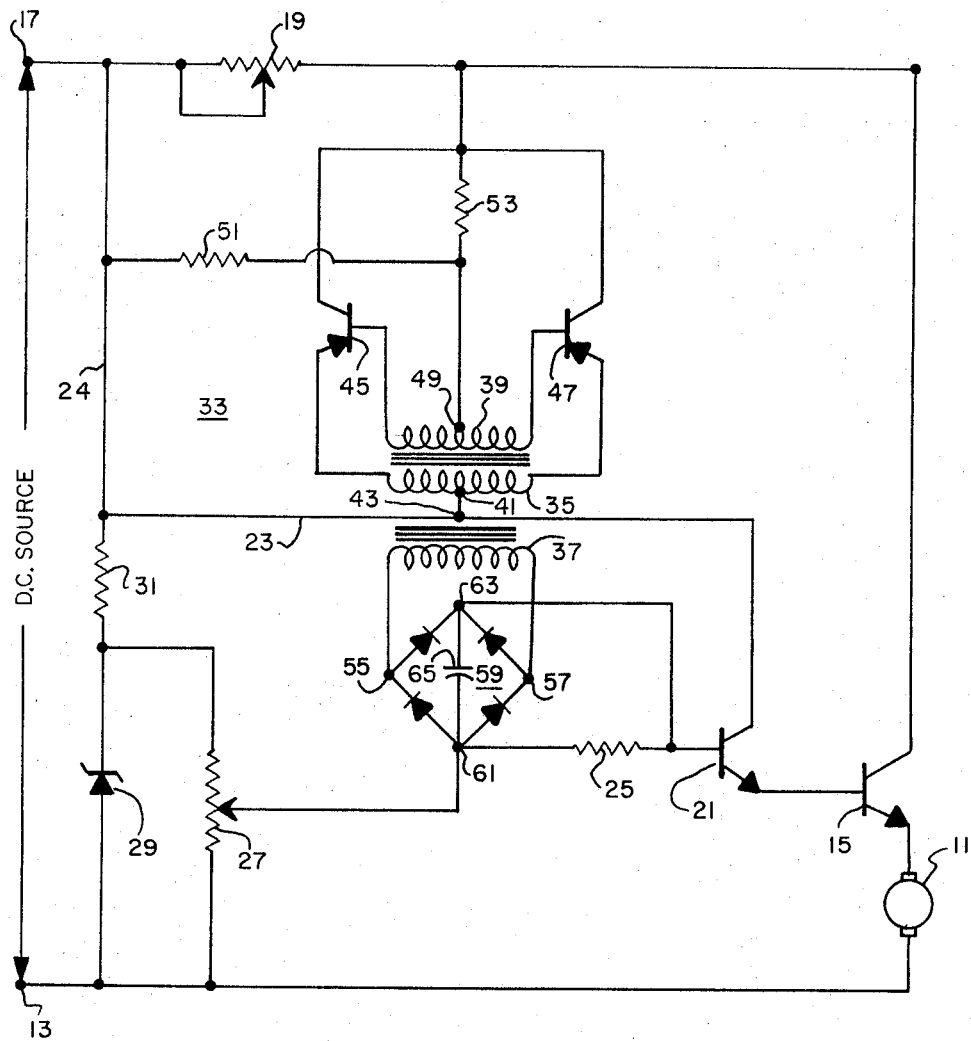
WILLIAM M. McCAMPBELL
HERSHEL M. NANCE
INVENTORS
BY
ATTORNEYS 3,573,583

DC MOTOR SPEED CONTROL SYSTEM

ORIGIN OF THE INVENTION

The invention described herein was made by employees of the United States Government and may be manufactured and used by or for the Government of the United States of America for Governmental purposes without the payment of any royalties thereof on therefor.

BACKGROUND OF THE INVENTION

This invention relates to motor speed control systems and more particularly to a motor speed control system employing feedback to achieve constant speed under varying loads.

In many applications it is desirable to continuously vary the speed of an electric motor and yet make the motor speed constant at a selected speed with varying loads on the motor. An example of such an application is the use of small fractional horsepower motors for driving constant speed welding equipment. This can include, but certainly not be limited to, welding wire drivers for automatic welding, the orbit-arc welder, and weld carriages.

In order to keep the speed of direct current motors constant, many solutions have been suggested. In accordance with one such solution, a constant voltage is applied across the armature of the motor. In such a system the speed is set by the selected constant voltage applied to the armature and under varying light loads the speed will remain relatively constant. Such a system, however, does not keep the motor speed constant as the variation of the load increases, because the voltage across the armature of the motor is equal to the back EMF of the motor plus the IR drop (current $X$ resistance) across the resistance of the armature of the motor. As the load on the motor increases, the IR drop increases and becomes a greater factor of the voltage across the armature. According, when the motor is subjected to heavy loads maintaining the voltage across the armature constant will not maintain the motor speed constant.

One method of overcoming the variation in speed due to the IR drop, is to provide a resistance in series with the armature equal to the armature resistance. In this manner a signal equal to the IR drop of the motor may be obtained by detecting the voltage drop across the series resistor. This equal signal is used as a voltage feedback to increase the voltage applied to the armature. Accordingly the speed of the motor is maintained constant at a value corresponding to the input voltage even though the load on the motor varies from being heavy to light. See U.S. Pat. No. 3,309,596 which discloses this method. In this method certain deficiencies and disadvantages are inherent. First because the resistor in series with the armature is identical to resistance and power capabilities to the motor armature resistance a loss occurs due to the power dissipated in the series resistor. Secondary, current drawn by the regulator circuitry adds to the current drawn by the series resistor and thirdly each regulator circuit must be designed for a particular motor.

Accordingly an object of the present invention is to provide an improved motor control system individually adaptable to a variety of motors of different capabilities.

Another object of the present invention is to provide a motor control system including means making the speed of the motor variable over continuous range, which speed control system will maintain the speed of the motor constant at selected speeds even though the load across the motor varies.

A still further object of the present invention is to provide a motor control system which employs feedback to maintain the speed of the motor constant under varying loads.

SUMMARY OF THE INVENTION

Briefly stated, these and other objects of the invention are achieved in one practical form in a motor control system which includes a source of constant DC voltage. A unity voltage gain amplifier is provided for driving the motor in accordance with the constant voltage source to which is added a voltage equal to the IR drop of the motor armature. To obtain a feedback signal equal to the IR drop of the motor, a variable resistor is placed in series with the armature of the motor and thus produces a voltage proportional to the armature current and proportional to the IR drop. An inverter circuit is provided having an input responsive to the voltage drop across the variable resistor and having its output connected to the input amplifier. The inverter is provided with a step-up circuit so as to allow a voltage equal to the IR drop to be applied to the input of the amplifier while allowing the variable resistor to have a resistance substantially smaller than the armature resistance.

The novel and distinction features of this invention are set forth in the claims appended to the specification. The invention itself, however, together with further objects and advantages thereof may best be understood by reference to the following description and accompanying drawing in which the sole FIG. is a circuit diagram of a speed control system in accordance with an embodiment of the invention.

DESCRIPTION OF A PREFERRED EMBODIMENT

As shown in the sole FIG., the armature of the motor is designated by the reference numeral 11. The motor used in the circuit of the present embodiment is a DC motor of the fixed field type such as would be provided by a permanent magnetic or a field winding connected directly across the source of DC power. It will be understood, however, that the principles of the present invention will be applicable to other kinds of motors, the speed of which can be controlled by varying the current or voltage applied thereto.

One side of the armature 11 is connected to the negative source of DC power applied to a terminal 13. The other side of the armature 11 is connected to the emitter of a transistor 15. The collector of transistor 15 is connected to the positive source of DC applied to terminal 17 via variable resistor 19. The base of transistor 15 is connected to the emitter of transistor 21. The collector of transistor 21 is connected to the positive terminal 17 via leads 23 and 24 while the base of transistor 21 is connected to one end of resistor 25. The opposite end of resistor 25 is connected to the movable tap of a potentiometer 27 that is connected between the negative terminal 13 and the junction of zener diode 29 and resistor 31. The resistor 31 and Zener diode 29 are connected in series between positive terminal 17 and negative terminal 13 by lead 24.

An inverter circuit, generally shown at 33, includes a three winding transformer 34 having a center tapped primary winding 35 a secondary winding 37 and a center tapped feedback winding 39. Center tap 41 of winding 35 is connected to lead 23 via lead 43. Opposite ends of winding 35 are respectively connected to the emitters of transistors 45 and 47. The collectors of transistors 45 and 47 are each connected to one side of resistor 19 and to one side of resistor 53. The base elements of transistors 45 and 47 are respectively connected to opposite end of feedback winding 39. The center tap 49 of winding 39 is connected to the junction of resistors 51 and 53 and the opposite ends of the secondary winding 37 are connected to the input terminals 55 and 57 of full-wave rectifier 59. The output terminals 61 and 63 of the full-wave rectifier 59 are respectively connected across resistor 25. Filtering capacitor 65 is connected across output terminals 61 and 63.

In operation, the DC voltage applied to terminals 17 and 13 will be divided between the connection of resistor 31 and Zener diode 29 with a constant voltage drop occurring across Zener diode 29. Potentiometer 27 connected across Zener diode 29 accordingly will provide a substantially constant voltage source. The voltage produced at the movable tap of potentiometer 27 and applied to the base of transistor 21 determines the voltage applied to the armature 11 of the motor and thus determines the speed at which the motor will operate. It will be recognized that transistors 21 and 15 represent emitter-follower stages in tandem and in operation approach a unity voltage gain amplifier. By moving the movable tap of the potentiometer 27 towards the terminal 13 the speed of the motor will be decreased and by moving the movable tap towards the terminal 17 the speed of the motor will be increased.

In operation, transistor 21 and 15 operate to set the voltage across the armature 11 to be approximately the voltage applied to the base of transistor 21 minus the voltage drop between the base-emitter junctions of transistors 15 and 21. The voltage across the armature 11 controls the speed of the motor, because of speed of the motor will increase or decrease until the back EMF generated by the motor plus the IR drop through the armature equals the voltage across the armature. Since the IR drop is small under light loads, the controlling of the voltage across the armature 11 to be constant will maintain a substantially constant speed of the motor under relatively light loads.

When the load on the motor increases tending to slow the motor down the back EMF would tend to drop. Since the voltage applied to the motor remains constant the IR drop would increase due to the increase in current flow in the collector-emitter circuit of transistor 15. Resistor 19 in series with the armature 11 carries substantially all of the armature current and thus a voltage proportional to the IR drop of the armature is produced across resistor 19. A voltage equal to the IR drop of the armature is obtained and applied to the input of transistor 21 in the following manner.

Inverter 33 operates to convert the DC voltage appearing across resistor 19 into an AC voltage that is applied to terminals 55 and 57 of full-wave rectifier 59. Inverter 33 is a conventional self-excited inverter circuit in which transistors 45 and 47 alternately conduct, causing the DC voltage across resistor 19 to switch back and forth through primary winding 35. This will induce an AC voltage in the secondary winding 37. Winding 37 is connected across the input of full wave rectifier 59 to obtain a DC voltage that is applied as a positive feedback to the base of transistor 21 by the connection terminals 61 and 63 across resistor 25.

To obtain a positive feedback voltage equal to the IR drop across the resistance of armature 11, while maintaining resistor 19 substantially smaller in resistance than the resistance of armature 11, transformer 34 is provided with an appropriate step-up ratio. Variable resistor 19 is adjusted so that the step-up in voltage provided by transformer 34 causes the voltage drop across resistor 25 to be equal to the IR drop across the resistance of armature 11. It will be recognized that through the use of a variable resistor 19 motors having an extended range of armature resistance may be controlled by the same control circuit.

Accordingly when the constant DC voltage input to transistor 21 is set by adjustment of the tap of potentiometer 27, a positive feedback is added to the constant voltage that is equal to the IR drop across the resistance of the armature. In this manner the speed of the motor is maintained constant under widely varying loads.

We claim:
1. A motor control system comprising:
an electric motor;
a unity voltage gain amplifier connected to said motor for controlling the voltage applied to the armature of said motor;
first control means to apply a selectively variable DC voltage to the input of said amplifier to selectively vary the voltage applied to said armature;
a variable resistor connected in series with said armature circuit;
a self-excited inverter having an input connected across said resistor for converting the DC voltage drop across said resistor to an AC voltage of increased magnitude;
rectifier means connected to the output of said inverter for converting said AC output to a DC voltage; and
means for applying said DC voltage to the input of said amplifier as a positive feedback voltage.
2. The apparatus of claim 1 wherein said amplifier comprises a 2-stage transistor emitter follower amplifier.
3. The apparatus of claim 1 wherein said selectively variable DC voltage applied to the input of said amplifier is variable over a continuous range.
4. The apparatus of claim 1 wherein:
said first control means includes a source of DC voltage;
a resistor and Zener diode connected in series across said DC source;
a potentiometer connected across said Zener diode; and
said potentiometer having a movable tap coupled to the input of said amplifier.
5. The apparatus of claim 1 wherein said variable resistor has a resistance substantially smaller than the resistance of said armature.
6. The apparatus of claim 4 wherein said movable tap is connected to one side of a coupling resistor, the other side of said resistor being connected to the input of said amplifier and wherein the output of said rectifier means is connected across said coupling resistor.